Sept. 24, 1968   A. J. SCHREIBER   3,402,428
APPARATUS FOR MAKING CONTINUOUS FILMS
Filed Aug. 5, 1966
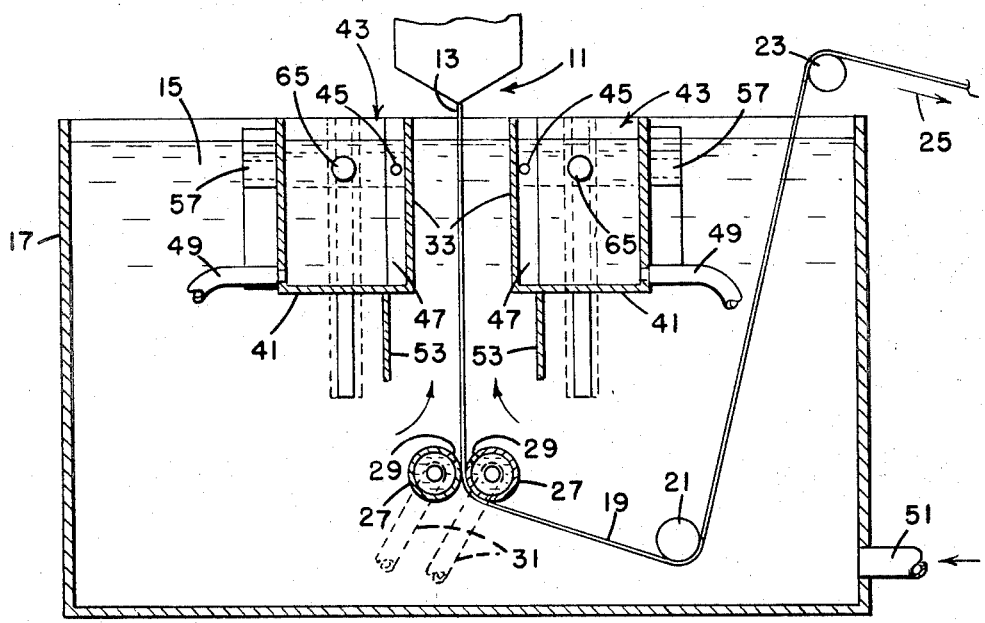
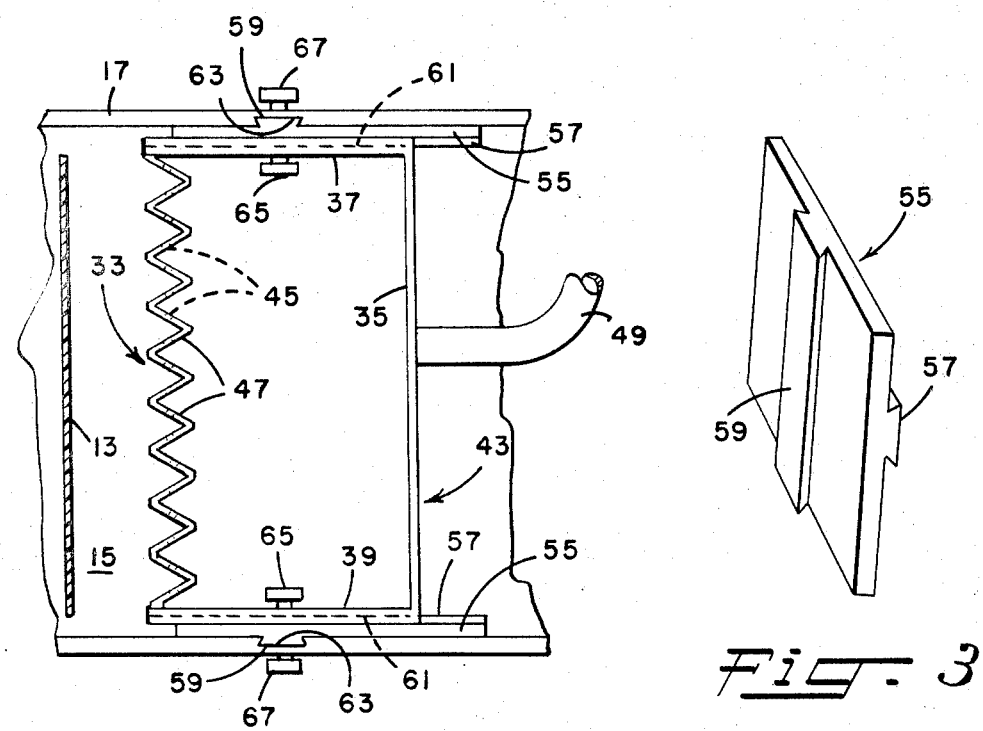

United States Patent Office 3,402,428
Patented Sept. 24, 1968

3,402,428
APPARATUS FOR MAKING CONTINUOUS FILMS
Anthony J. Schreiber, Philadelphia, Pa., assignor to Avisun Corporation, Philadelphia, Pa., a corporation of Delaware
Filed Aug. 5, 1966, Ser. No. 570,529
4 Claims. (Cl. 18—15)

ABSTRACT OF THE DISCLOSURE

A cooling bath for a shaped stream of molten film-forming material includes a pair of vertical serrated, perforated baffles one on each of the opposite sides of the path of the stream. Non-turbulent streams of quenching liquid are made to flow along path of stream but in the opposite direction thereto, thence laterally away from path of stream and through the baffle openings.

---

The present invention relates to the manufacture of films or webs from thermoplastic polymeric materials having improved optical and physical properties.

In forming continuous films or webs from thermoplastic polymeric film-forming materials as, for example, from polypropylene and polyethylene, a shaped stream of molten film-forming material is generally extruded downwardly into a bath of cool water where it is quenched into a solid film or web. Once removed from the quenching bath, this formed film is stretched uniaxially or biaxially successively or simultaneously in longitudinal and transverse directions.

Stretching of the formed film is usually carried out to obtain certain advantages, such as increased strength, which extend from the orientation of the polymer molecules. The greater the extent to which the film is stretched (generally referred to as the stretch ratio), the more closely optimum orientation is approached and, naturally, the greater the yield in surface area of the film. The initial thickness of the film, of course, dictates the maximum degree to which such film may be stretched. Thus, the objective has long been to develop ways for making films which are of thicker cross section yet possess desired physical and optical properties and are capable of being stretched. Merely adapting known extrusion procedures for use in making thicker films is unsatisfactory since thicker shaped streams of molten film-forming material cool more slowly and thus result in films having poor optical characteristics. On the other hand, attempts to achieve a more rapid cooling of such thicker shaped streams of film-forming material generally result in films of non-uniform thickness which can be stretched only with great difficulty, if at all. Accordingly, a primary object of this invention is to provide a generally new or improved and more satisfactory apparatus for making continuous films having desired optical and physical properties.

Another object is the provision of an apparatus for making comparatively thick, continuous thermoplastic films which are of generally uniform properties along their length.

Still another object is the provision of an apparatus for making stretchable films which are of thicker cross-section than was heretofore possible without involving any apparent sacrifice in the physical and/or optical properties thereof.

A further object is to provide an improved apparatus for making films which facilitates more rapid quenching of shaped streams of molten film-forming material.

Still further objects will be apparent from the following description:

In general, the apparatus of the present invention facilitates a more rapid quenching of a shaped stream of molten film-forming polymeric material than was heretofore possible without involving any sacrifice in the optical and/or physical properties of the resulting film. The apparatus is not limited for use in making films of any specific thickness. It can, therefore, be employed in making films of such thickness as are being produced by conventional film-forming equipment and, in view of the more rapid quenching rate which is provided, permits faster production speeds. Alternatively, and to satisfy an objective long desired in the industry, the apparatus of the present invention is especially suited for making films which are of greater thickness than those made on known film-forming equipment and which are capable of being stretched to a much higher order with equipment presently in use. Thus, such thicker films not only facilitate a greater yield of oriented film, from the standpoint of surface area, but also provide films having improved physical properties, such as greater strength and shrinkability.

The apparatus of the present invention includes a conventional extruder from which a continuous shaped stream of molten film-forming polymeric material is discharged into a tank containing a bath of quenching liquid, such as water. A vertically disposed, perforated baffle is positioned within the tank along each of the opposite sides of the path of the shaped stream of film-forming material as it enters the quenching bath. The perforations or openings in the baffles are spaced along the lengths of respective baffles so that continuous and non-turbulent streams of quenching liquid flow in opposite directions, laterally away from the path of the shaped stream of film-forming material, through the baffle openings and into collection chambers which are formed in part by the baffles.

The streams of quenching liquid which flow toward and through the baffle openings are comparatively small so as to avoid inducing any turbulence within or along the bath surface which might be reflected in the stream of film-forming material during quenching. Together, however, these streams of quenching liquid provide for a rapid removal of a large volume of liquid, and particularly that portion of the quenching liquid which has served to extract perhaps the greatest amount of heat from the film-forming material. The quenching liquid which is withdrawn is replenished by cool liquid delivered into the tank at one or more locations well removed from the baffles so that the portion of the liquid bath into which the shaped stream of film-forming material first enters is continuously replaced and maintained at a generally uniform and low temperature.

As heretofore mentioned, removal of quenching liquid from in-between the baffles involves little, if any, fluctuations or turbulence within or along the surface of the liquid bath. Moreover, any such agitation as well as any other agitation introduced into the bath and/or the surrounding atmosphere by the passage of the shaped stream of film-forming material is suppressed or dampened by the baffles themselves. This is most effectively achieved by shaping the opposing walls of the baffles with vertically extending serrations and preferably serrations which are of sinuous or saw-tooth configuration. In such construction, the baffle openings are formed at substantially right angles to the angulated or inclined faces of the walls forming the serrations so that any turbulence which may be created would most likely exist along the faces of the baffles and between the serrations, well removed from the stream of film-forming material being quenched and in an area where they can be best dampened.

Withdrawal of quenching liquid uniformly across the width of the shaped stream of film-forming material can usually be achieved by having at least one row or series of baffle openings of substantially the same size located approximately the same distance below the bath surface. It may be desirable, however, to have at least certain openings of each series of perhaps larger size and/or at greater distances below the bath surface than the remaining openings of such series where greater flow of quenching liquid away from the path of the film-forming material is found necessary. In other words, the objective is to quench the shaped stream of film-forming material along its entire width at substantially the same distance below the quench bath surface. With shaped streams of molten polypropylene and polyethylene, the location at which such quenching occurs is generally evident by what is termed in the art as "frost-line," which is a visual change in the appearance of the shaped stream. Thus, if it is found that the "frost-line" does not extend straight across the shaped stream, and is perhaps depressed at the center of such stream, the openings in the center portions of the baffles may be made slightly larger than the remaining openings to increase the volume flow in this area and/or may be located lower than the remaining openings to increase the liquid head and thus the rate of liquid flow in this area. Of particular importance is that the use of many small baffle openings, as compared to few openings of larger size or a continuous discharge slot, minimizes any turbulence which may be created within the quenching bath, enables the serrated baffle surfaces to more effectively dampen such turbulence and offers more exact control over the volume and rate of liquid flow at any area along the length of the respective baffles.

The baffles are preferably mounted for vertical adjustment relative to their supporting tank. Thus, while the size of the baffle openings remains constant, the rate at which the quenching liquid is withdrawn through the baffle openings can be changed by adjusting the baffle positions and thereby the head of liquid above the baffle openings.

In the drawing:

FIGURE 1 is a transverse vertical section through the apparatus of the present invention;

FIGURE 2 is a plan view of a portion of the apparatus shown in FIGURE 1; and

FIGURE 3 is a perspective view of an element of the apparatus shown in FIGURES 1 and 2.

With reference to the drawing, numeral 11 indicates a conventional die or nozzle for extruding a continuously and generally flat stream 13 of film-forming material, as for example, molten polypropylene or polyethylene, into a quenching liquid 15, such as cold water, contained within a tank 17. The shaped stream 13, upon being quenched into the form of a film or web 19, is passed over a reversing roller 21, and withdrawn from the tank 17 over a roller 23, as indicated by arrow 25.

At least one and preferably a pair of hollow guide bars or tubes 27 are positioned within the tank 17 to minimize the deflection of the film 19 from its intended path of travel and to assist the roller 21 in reversing the direction of film movement. As more fully described in copending U.S. patent application Ser. No. 319,719, filed Oct. 29, 1963, which ripened on Oct. 3, 1967 into Patent No. 3,344,474, the hollow bars 27 also assist in circulating the cooling liquid and, more importantly, in removing gas bubbles which might otherwise ride along the sides of the shaped stream of film-forming material. These latter functions are achieved by providing each guide bar 27 with a slot 29 which extends across the entire width of the film 19. Conduits 31 connected to ends of the hollow bars 27 and to a suitable pump, not shown, cause quenching liquid, along with any gas bubbles contained therein, to be continuously withdrawn from the opposite sides of the film 19.

A vertically disposed baffle 33, is positioned within the tank 17 along each of the opposite sides of the path of the shaped stream 13 of film-forming material and together with walls 35, 37, 39, and 41 forms a container 43. The baffles 33 are preferably of sinuous or saw-tooth configuration, as viewed in cross-section, so as to suppress or dampen fluctuations or turbulence within and along the surface of the quenching liquid 15. As illustrated, at least one series or row of openings 45 of like size are formed in the inclined faces 47 of the respective baffles 33 along a horizontal plane and at substantially uniform distances apart, these openings opening into the container 43. It will be understood, however, that the baffle openings of each series may vary in size and/or location, as heretofore described, to regulate the volume and rate of liquid flow at any particular location along the width of the shaped stream of film-forming material. Liquid collected within the containers 43 is removed through hoses 49, chilled, and then reintroduced into the tank 17 through one or more pipes 51 located at a position well removed from the baffles. If necessary, deflectors 53 may extend downwardly from the bottom walls 41 of the respective containers 43 to insure that the quenching liquid assumes a desired sweeping movement along the opposite sides of the film 19 as it travels in-between the baffles 33.

The containers 43 are each supported for both horizontal and vertical adjustment relative to the tank 17 by guide plates 55, which, as shown in FIGURE 3, are formed with horizontal and vertical projections 57 and 59, respectively, of dove-tail cross-sections. The horizontal projections 57 of the guide plates 55 are received in correspondingly shaped slots 61 formed in the outside surfaces of the container end walls 37 and 39, while the vertical projections 59 are adapted to ride along slots 63 formed along the inside surfaces of the tank walls. Thumb screws 65 and 67 are provided for locking the container 43 and the guide plates 55 in their respective adjusted positions.

In the operation of the above described apparatus, the containers 43 and guide plates 55 are adjusted into approximate positions after which a shaped stream 13 of molten thermoplastic polymeric material is extruded from the nozzle 11 and into the quenching liquid 15 contained within the tank 17. This stream 13, once solidified as a film 19, is laced in-between the hollow guide bars 27 and about rollers 21 and 23 in the manner illustrated in FIGURE 1. The containers 43 are now more accurately adjusted horizontally along the guide plates 55 to locate the baffles 33 in positions for most efficiency suppressing any agitation which may exist along or within the liquid bath in the vicinity of the path of the shaped stream 13. The guide plates 55 are then adjusted vertically along the tank walls so as to vary the head of quenching liquid, and thus the flow of liquid through the baffle openings 45, until the desired quenching of the shaped stream is obtained. As heretofore mentioned in the manufacture of polypropylene and polyethylene films, the location at which the shaped stream 13 is quenched is generally evidenced by a change in optical appearance, often referred to as a "frost-line," which the operator can employ as a guide in adjusting the container.

In passing in-between the hollow guide bars 27, gas bubbles are removed from the opposite sides thereof along with streams of quenching liquid, through the slots 29, as more fully described in the above-noted copening U.S. patent application.

The rate at which the quench liquid is withdrawn from in-between the baffles 33 will, of course, depend upon such factors as the particular polymeric material being extruded, the speed and thickness of the extruded stream of polymeric material, the optical properties observed in the finished film, etc. For example, using a conventional apparatus, as haped stream of molten polypropylene at an approximate temperature of 550° F. was extruded through a die having a gap or opening of 0.035 inch into a bath of water at 42° F. At a collection or take-up speed of about 300 feet per minute, the shaped stream exhibited a "frost-line" about 2.75 inches below the quenching liquid and the finished film had a thickness of 15 mils.

Using the apparatus of the present invention, and under the same conditions noted above, baffles were located about 3.50 inches from the path of extruded stream and adjusted to provide a head of liquid of 0.35 inch above a series of baffle openings of approximately 0.25 inch in diameter and spaced about 1.25 inches along the lengths of the respective baffles. In this instance the extruded stream exhibited a "frost-line" at about 2.25 inches below the quenching liquid surface. With the apparatus of the present invention, it was found that by increasing the rate at which the solid film was collected to about 400 feet per minute, a "frost-line" appeared across the stream at about the same distance below the bath surface as provided by conventional apparatus. In all cases, the films produced exhibited like properties and were well adapted for biaxial stretching with conventional equipment.

In lieu of increasing the rate of film take-up, it was found that using a die gap of 0.035 inch and a film take-up speed of about 300 feet per minute, the volume of extrudate could be increased about 35 percent to provide films of 25 mils in thickness. These films could be readily stretched along biaxial directions and exhibited good optical and physical properties. Satisfactory films of this thickness, and which were capable of being oriented, could not heretofore be made. In view of the increased thickness of these films over those made by conventional equipment, stretch ratios applied biaxially of the films could be increased from the normal ratio of about 4:1 to as much as 15:1 and more without encountering film rupture.

It is to be understood that changes and variations may be made without departing from the spirit and scope of the invention as defined in the appended claims.

I claim:
1. Apparatus for making a continuous film comprising a tank for containing a bath of quenching liquid, a pair of baffles formed with vertically-extending serrations and positioned within said tank in spaced apart relationship for suppressing turbulence and fluctuations within that portion of the quenching liquid located between said baffles, means for extruding a continuous, generally flat stream of molten film-forming material of substantial width into said tank between said baffles, whereby the stream is quenched to form a solid film, means including separate openings extending substantially horizontally, in a direction generally parallel to the width of said stream, through walls forming said baffle serrations for continuously withdrawing quenching liquid from between the opposing faces of said baffles and discharging the same from said tank, said openings being generally spaced apart uniform distances along the width of the respective baffle, in a direction substantially parallel to the width of said stream; and means removed from said baffles for delivering quenching liquid into said tank.

2. Apparatus as defined in claim 1, wherein said serrations are of saw-tooth configuration.

3. Apparatus in accordance with claim 1, wherein said means for withdrawing quenching liquid includes separate containers individual to each of said baffles and formed in part thereby for collecting the quenching liquid passing through said baffle openings.

4. Apparatus according to claim 1, including also means for adjusting said baffles along horizontal and vertical directions relative to each other and to said tank.

References Cited
UNITED STATES PATENTS

| | | | |
|---|---|---|---|
| 2,077,836 | 4/1937 | Herndon | 18—15 |
| 3,073,733 | 1/1963 | Mitchell | 18—15 XR |
| 3,087,198 | 4/1963 | Edwards | 18—15 |
| 3,199,148 | 8/1965 | Koppehele | 18—15 |
| 3,344,474 | 10/1967 | Davis et al. | 18—15 |

WILLIAM J. STEPHENSON, *Primary Examiner.*